United States Patent

[11] 3,587,680

[72] Inventor James L. Bishop, Jr.
 Memphis, Tenn. (606 Kingshighway, Cape Girardeau, Mo., 63701)
[21] Appl. No. 719,328
[22] Filed Apr. 8, 1968
[45] Patented June 28, 1971

[54] STRAIGHT EDGE FIXTURE FOR WOODWORKING
4 Claims, 4 Drawing Figs.

[52] U.S. Cl. .................................................. 143/157,
 33/76, 143/47, 143/51, 83/442
[51] Int. Cl. ........................................................ B27b 27/02
[50] Field of Search............................................ 308/3, 3
 (A); 143/160, 160.2, 167, 47, 47.2, 47.6; 145/129;
 144/242, 253.2, 253; 83/442; 33/76, 107; 269/1;
 143/51, 51.1, 52; 143/43.1.5, 43.6.5

[56] References Cited
UNITED STATES PATENTS
| 1,038,215 | 1912 | Shaw | 143/51X |
| 1,917,926 | 1933 | Decker | 308/3X |
| 3,011,530 | 1961 | Lamb | 143/47X |

Primary Examiner—Andrew R. Juhasz
Assistant Examiner—James F. Coan
Attorney—Paul M. Denk ABSTRACT: A fixture for use in woodworking having an elongated angular guide including a sinuous spring and fasteners to hold a piece of board in alignment against a saw guide and provide a straight edge for the saw to follow in cutting a straight edge across the board.

PATENTED JUN28 1971
3,587,680
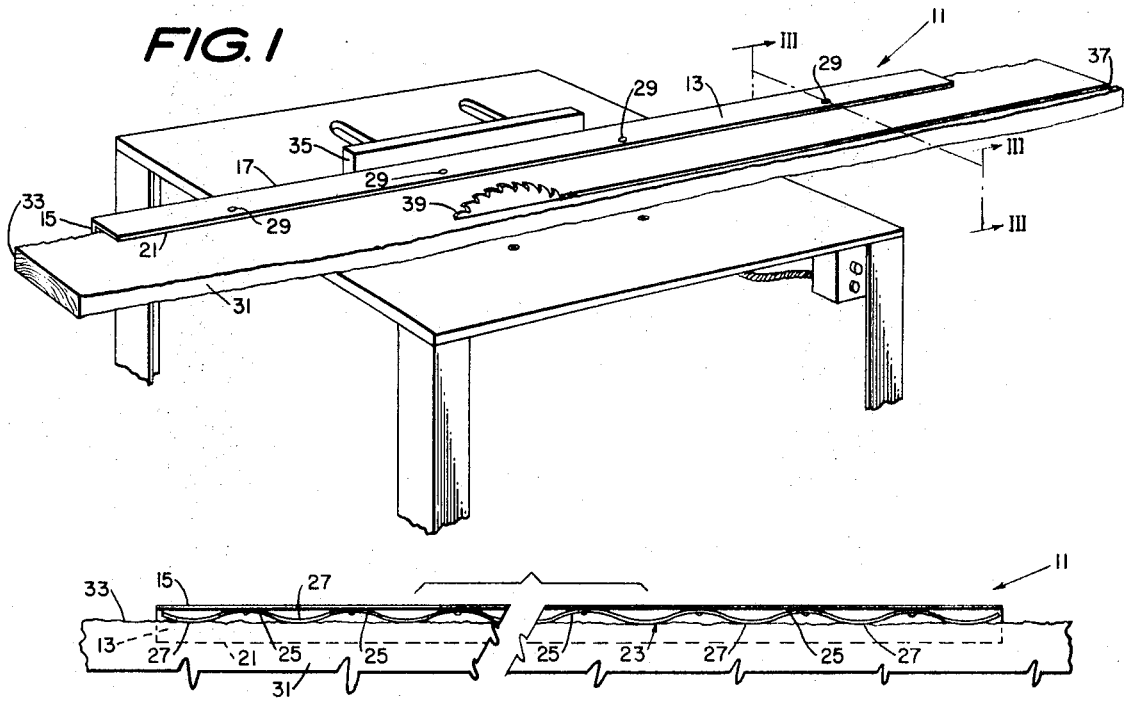
FIG. 1
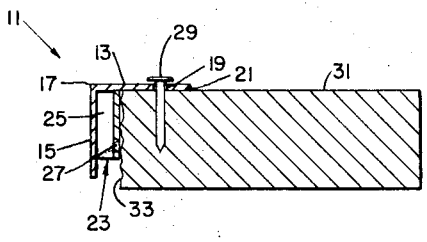
FIG. 2
FIG. 3
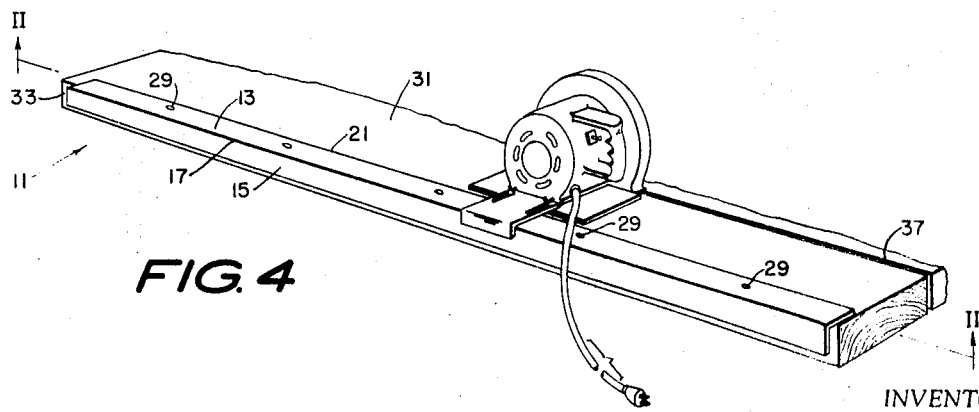
FIG. 4
INVENTOR,
JAMES L. BISHOP
BY
Weatherford & Weatherford
attys

STRAIGHT EDGE FIXTURE FOR WOODWORKING

BACKGROUND OF THE INVENTION

1. Field of the Invention

The present invention relates to guide means for use with power driven saw means to provide a substantially straight saw-cut across a piece of lumber.

The present invention further relates to means detachably connected to a piece of lumber to provide straight edge guide means for use with a power saw to provide the saw with alignment means for cutting a straight saw-cut along a board having an oppositely spaced, substantially parallel irregular edge.

2. Description of the Prior Art

There have been prior devices for use with woodworking fixtures but these prior devices have related to specialized means such as jigs for sawing tenons, safety attachments to power saws, saw table guide blocks and rip fences for saw tables. None of these prior devices has provided means for aligning an irregular surface against a saw guide to effect a straight line saw-cut across a piece of lumber, parallel to the irregular surface.

A search disclosed the following reference as most pertinent: U.S. Pat. Nos. 1,038,215, Shaw, Sept. 10, 1912; 1,713,329, Clayton, May 14, 1929; 2,679,868, Johnson, June 1, 1954; 2,739,625, Peters, Mar. 27, 1956; 2,799,303, Lee, July 16, 1957.

Field of the search was: Class 143, Subclasses 51 and 52.

SUMMARY OF THE INVENTION

The present invention provides substantially elongated guide means for detachable engagement with a semifinished board or similar piece of lumber.

The present invention further provides elongated sinuous spring means included in the elongated guide means for aligning the guide means substantially parallel with the longitudinal axis of the board or piece of lumber.

The present invention additionally includes edge means carried by the elongated guide means for sliding engagement with the guide bar of a power saw to provide the saw blade with a substantially straight cutting line longitudinally across the board or piece of lumber.

OBJECTS OF THE INVENTION

The principal object of the present invention is to provide a straight edge guide for use in woodworking.

Another object of the present invention is to provide a straight edge guide for use in woodworking having means therein for detachable engagement with an unfinished side of a piece of lumber.

A further object of the present invention is to provide a straight edge guide for woodworking including sinuous spring means to align the guide with one of the longitudinal sides of a piece of lumber.

Another object of the present invention is to provide a straight edge guide for detachable engagement with a board for aligning the board with the guide of a power driven saw.

A further object of the present invention is to provide guide means for aligning an unfinished side of a piece of lumber with a power saw to effect an uninterrupted substantially straight finishing cut along the other of the sides of the piece of lumber substantially perpendicular to the ends of the piece of lumber; and Another object of the present invention is to generally improve the design, construction and efficiency of straight edge guide means for use in woodworking.

DESCRIPTION OF THE DRAWINGS

The means by which the foregoing and other objects of the present invention are accomplished and the manner of their accomplishment will be readily understood upon reference to the accompanying drawings, in which:

FIG. 1 is a perspective view of the device of the present invention.

FIG. 2 is a fragmentary inverted plan view of the device of FIG. 1.

FIG. 3 is a vertical cross-sectional view of the device of FIG. 1 as taken on the line III—III of FIG. 1; and FIG. 4 is a perspective view of the device of FIG. 1 illustrating the device in use with portable saw means.

DESCRIPTION OF THE PREFERRED EMBODIMENT

Referring now to the drawings in which the various parts are indicated by numerals, the present invention comprises a substantially elongated woodworking guide means 11 including a pair of coextensive flange members 13, 15, and a common coextensive junction 17 provided for maintaining the respective flanges 13, 15 in substantially rigid perpendicular relation. The flange 13 is provided with a plurality of substantially longitudinally aligned apertures 19 spaced somewhat inwardly from and parallel to the distal edge 21 of the flange 13.

The flange 15 depending from the common junction 17, substantially perpendicular with the flange 13 is provided with a substantially elongated sinuous flexible band 23 attached thereto on the inner face thereof. The sinuous flexible band 23 preferably includes a plurality of sinusoidal members 25 alternately interposed between a like plurality of oppositely curving sinusoidal members 27. The sinusoidal members 25 are rigidly affixed to the inner surface of the flange 15 as by rivets or like fastening devices.

The guide means 11 additionally comprises fastening means such as the nails 29 for attaching the flange 13 thereof to a semifinished board 31 as best illustrated in FIG. 1 of the drawings. It will be thus readily seen that the guide means 11 are detachably attached to the board 31 as by the nails 29 driven through the apertures 19 carried by the flange 13, into the board 31 with the sinuous flexible band 23 in substantial abutment with the bark or unfinished edge 33 of the board 31. The guide means 11 are attached to the board 31 along the edge 33 thereof in such manner as to align the guide means 11 in substantially spaced parallel relation with the longitudinal axis of the board 31. It will be further seen that the sinusoidal members 27 flexibly bearing against the irregularly contoured unfinished edge 33 of the board 31 will additionally maintain the flange 15 of the guide 11 in substantial parallelism with the longitudinal axis of the board 31.

In the use of the device of the present invention, the guide means 11 are detachably attached to the board 31 as by the nails 29 with the sinuous band 23 somewhat flexibly compressed between the edge 33 of the board 31 and the vertical flange 15 of the guide means 11 to effect a substantial parallelism between the vertical flange 15 of the guide means and the longitudinal axis of the board 31. The outer longitudinal surface of the flange 15 is placed in adjacency with the saw guide bar 35 and slidably moved thereagainst to effect a saw-cut 37 by the saw blade 39 substantially parallel with the vertical flange 15 of the guide means 11. Pursuant the saw cut 37, the guide means 11 may be detached from the board 31 by removing the nails 29 therefrom. The board 31 may be then rotated 90° to align the saw-cut 37 with the saw guide bar 35 in close adjacency and further moved slidably thereagainst to cause the saw blade 39 to effect the removal, by conventional established means, of the irregularly contoured edge 33 of the board 31 to provide the user of the device with a finished dimensioned piece of lumber.

I claim:

1. A straight edge fixture for woodworking comprising guide means including
   1. a first flange having apertures therein, adapted for detachable engagement with the side of a board,
   2. a second flange depending from one side of said first flange,
      a. in spaced adjacency to one of the unfinished edges of said board,
   3. a sinuous band attached to said second flange interposed between said second flange and said one of the unfinished edges of said board, and 4. means to detachably attach said guide means to said board in substantial alignment with the longitudinal axis of said board.

2. Means in accordance with claim 1, wherein said sinuous band is provided with a plurality of like sinusoidal members.

3. Means in accordance with claim 2, wherein one-half of said sinusoidal members are rigidly attached to said second flange.

4. Means in accordance with claim 2, wherein one-half of said sinusoidal members are in flexible compressive abutment with the irregular edge of said board.